(12) United States Patent
Nozawa

(10) Patent No.: US 10,759,294 B2
(45) Date of Patent: Sep. 1, 2020

(54) POWER SOURCE SYSTEM FOR VEHICLE

(71) Applicant: TOYOTA JIDOSHA KABUSHIKI KAISHA, Toyota-shi, Aichi-ken (JP)

(72) Inventor: Takashi Nozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/165,181

(22) Filed: Oct. 19, 2018

(65) Prior Publication Data

US 2019/0135120 A1 May 9, 2019

(30) Foreign Application Priority Data

Nov. 8, 2017 (JP) .................... 2017-215716

(51) Int. Cl.
| | |
|---|---|
| *B60L 53/24* | (2019.01) |
| *H02M 1/36* | (2007.01) |
| *H02P 27/06* | (2006.01) |
| *H02M 3/158* | (2006.01) |

(52) U.S. Cl.
CPC ............. *B60L 53/24* (2019.02); *H02M 1/36* (2013.01); *H02M 3/158* (2013.01); *H02P 27/06* (2013.01)

(58) Field of Classification Search
CPC ......... B60L 53/24; H02M 1/36; H02M 3/158; H02P 27/06
See application file for complete search history.

(56) References Cited

U.S. PATENT DOCUMENTS

| | | | | |
|---|---|---|---|---|
| 2004/0185317 A1* | 9/2004 | Aoyagi | ............. | H01M 8/04223 429/429 |
| 2011/0316489 A1* | 12/2011 | Norimatsu | .............. | H02M 1/36 320/166 |
| 2014/0217812 A1* | 8/2014 | Sugiyama | .............. | B60L 58/14 307/9.1 |

FOREIGN PATENT DOCUMENTS

| | | |
|---|---|---|
| JP | 2016-135010 A | 7/2016 |
| JP | 2017-085810 A | 5/2017 |

* cited by examiner

*Primary Examiner* — Daniel Kessie
*Assistant Examiner* — Kalu Kelly Emeaba
(74) *Attorney, Agent, or Firm* — Oliff PLC

(57) ABSTRACT

A power source system may include a main power source, a power converter including a capacitor, a relay configured to switch between connection and disconnection between the power converter and the main power source, an auxiliary power source, a boost converter having a low voltage terminal thereof connected to the auxiliary power source, and having a high voltage terminal thereof connected to the power converter without interposing the relay, and a controller configured to pre-charge the capacitor prior to placing the relay in a connected state when a main switch of a vehicle is turned on. The controller may be configured to store a peak value of a current of the auxiliary power source in a memory of the controller, and start to pre-charge the capacitor when a current of the auxiliary power source falls from the peak value by more than a predetermined current difference.

2 Claims, 3 Drawing Sheets

POWER SOURCE SYSTEM FOR VEHICLE

CROSS-REFERENCE TO RELATED APPLICATION

This application claims priority to Japanese Patent Application No. 2017-215716 filed on Nov. 8, 2017, the contents of which are hereby incorporated by reference into the present application.

TECHNICAL FIELD

The technology disclosed herein relates to a power source system for a vehicle, and particularly relates to a power source system for a vehicle that includes a high voltage power source for a traction motor and a low voltage power source for an auxiliary device.

BACKGROUND

An electric vehicle (including a fuel-cell vehicle and a hybrid vehicle) includes a high voltage power source (a main power source) for a traction motor and a low voltage power source (an auxiliary power source) for an auxiliary device. The "auxiliary device" is a generic term for vehicle-mounted devices that have an operating voltage lower than a voltage of the traction motor. The operating voltage of the vehicle-mounted devices is equal to or lower than approximately 50 volts. The traction motor has a driving voltage higher than 100 volts, and the main power source has an output voltage exceeding 100 volts. In other words, the auxiliary power source has an output voltage lower than the output voltage of the main power source. Typical examples of the main power source are a lithium-ion battery and a fuel cell. A secondary battery, which is rechargeable, is adopted as the auxiliary power source. A typical example of the auxiliary power source is a lead battery. Japanese Patent Application Publication No. 2017-085810 and Japanese Patent Application Publication No. 2016-135010 illustrate such power source systems.

The main power source is connected to a power converter via a system main relay. The power converter converts power from the main power source into driving power of the traction motor. The power converter includes a capacitor connected between a positive electrode and a negative electrode of the main power source. The capacitor is provided for smoothing a current supplied from the main power source or for temporarily storing power energy in a chopper-type voltage converter. When the system main relay is closed and the power converter is connected to the high voltage power source at turn-on of a main switch of the vehicle, a large current flows into the capacitor through the system main relay. The surge of the large current may cause contact melting in the system main relay. In this respect, in the power source system in each of Japanese Patent Application Publication No. 2017-085810 and Japanese Patent Application Publication No. 2016-135010, the capacitor is charged by using an auxiliary battery prior to switching the system main relay to a connected state. Charging the capacitor before switching the system main relay to the connected state is referred to as pre-charging.

The power source system in each of Japanese Patent Application Publication No. 2017-085810 and Japanese Patent Application Publication No. 2016-135010 includes a boost converter having a low voltage terminal thereof connected to the auxiliary power source and a high voltage terminal thereof connected to the power converter without interposing the system main relay. A controller of the power source system pre-charges the capacitor with power from the auxiliary power source by operating the boost converter prior to switching the system main relay to the connected state.

To ensure execution of the pre-charging even in a case where a remaining amount in the auxiliary power source is small, the power source system in Japanese Patent Application Publication No. 2016-135010 activates only an auxiliary device required for the pre-charging, while prohibiting activation of another auxiliary device.

SUMMARY

An auxiliary power source supplies power to various auxiliary devices. An air conditioner, a room lamp, a car navigation system as well as various kinds of controllers including a controller of a power source system belong to auxiliary devices, and are supplied with power from the auxiliary power source. When a main switch of a vehicle is turned on, some of the auxiliary devices execute their initializing processes at activation. If consumption power of the other auxiliary devices increases during the pre-charging, power from the auxiliary power source may become insufficient, which may result in unstable operations of the other auxiliary devices. The disclosure herein provides a technology capable of stably executing pre-charging by using an auxiliary power source to which various auxiliary devices are connected.

A power source system for a vehicle disclosed herein may comprise a main power source, an auxiliary power source, a power converter, a relay, a boost converter, and a controller. The power converter may be configured to convert an output power from the main power source and include a capacitor connected between a positive electrode and a negative electrode of the main power source. The relay may be configured to switch between connection and disconnection between the power converter and the main power source. The auxiliary power source may have an output voltage lower than an output voltage of the main power source. The boost converter may have a low voltage terminal thereof connected to the auxiliary power source and have a high voltage terminal thereof connected to the power converter without interposing the relay. The controller may be configured to pre-charge the capacitor by operating the boost converter prior to placing the relay in a connected state when a main switch of the vehicle is turned on. The controller may be configured to store a peak value of a current of the auxiliary power source in a memory of the controller and to start to pre-charge the capacitor when the current of the auxiliary power source falls from the peak value by more than a predetermined current difference.

As mentioned above, some of the auxiliary devices supplied with power from the auxiliary power source execute their initializing processes. In a course of the initializing processes, a required current may be increased. In the power source system disclosed herein, the pre-charging is executed after consumption current of the auxiliary devices has passed its peak and a available capacity (i.e., the predetermined current difference mentioned above) has been generated in the auxiliary power source. Since the other auxiliary devices do not request a current required at the peak during the pre-charging, the pre-charging can be executed stably.

Details and further improvements of the technology disclosed herein will be described in "DETAILED DESCRIPTION" below.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide an improved power source system for a vehicle, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
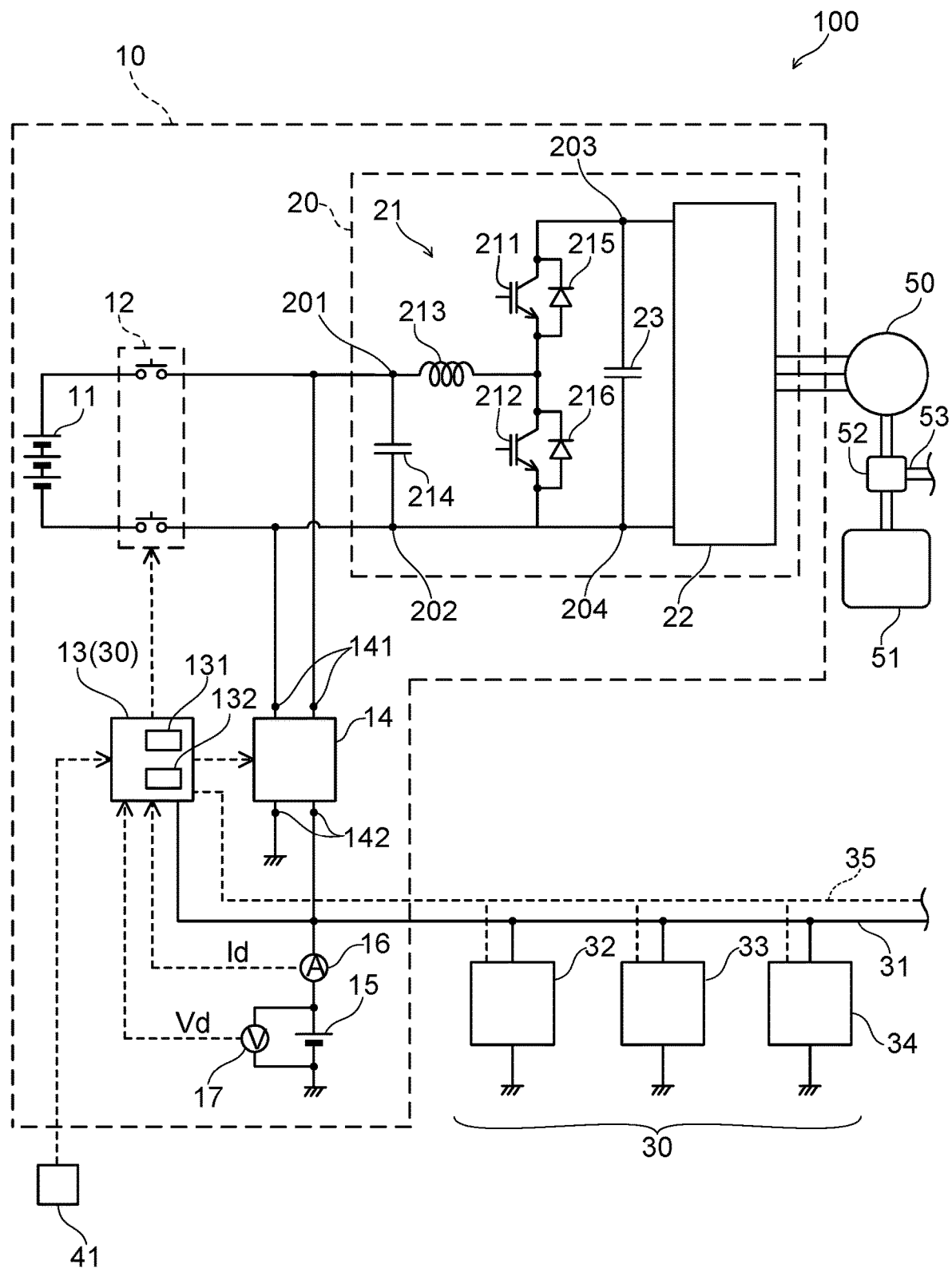
FIG. 1 is a block diagram of a power system of a hybrid vehicle that includes a power source system of an embodiment.

With reference to the drawings, a power source system 10 of an embodiment will be described. The power source system 10 of the embodiment is mounted on a hybrid vehicle 100. FIG. 1 illustrates a block diagram of a power system of the hybrid vehicle 100 that includes the power source system 10. The hybrid vehicle 100 includes a traction motor 50 and an engine 51. An output torque of the traction motor 50 and an output torque of the engine 51 are combined at a gear set 52 and transferred to an axle 53.

The hybrid vehicle 100 includes a main switch 41, an engine controller 32, an air conditioner 33, and a car navigation system 34, in addition to the power source system 10, the traction motor 50, and the engine 51. The engine controller 32, the air conditioner 33, and the car navigation system 34 are supplied with power from an auxiliary battery 15 through an auxiliary power line 31. A controller 13 included in the power source system 10 is also supplied with power from the auxiliary battery 15, which will be described in detail later. Devices supplied with power from the auxiliary battery 15 are collectively called "auxiliary devices". Hereinbelow, auxiliary devices such as the engine controller 32, the air conditioner 33, the car navigation system 34, and the controller 13 may be collectively called auxiliary devices 30.

The power source system 10 is a system that supplies power to the traction motor 50 and the auxiliary devices 30. The power source system 10 includes a main battery 11, the auxiliary battery 15, a system main relay 12, a power converter 20, a boost converter 14, and the controller 13.

The main battery 11 is a power source mainly for the traction motor 50. The main battery 11 is, for example, a rechargeable lithium-ion battery. The main battery 11 has an output voltage of, for example, 200 volts.

As mentioned above, the auxiliary battery 15 is a power source for supplying power to the auxiliary devices 30. The auxiliary battery 15 has an output voltage that is lower than the output voltage of the main battery 11, and the output voltage of the auxiliary battery 15 is, for example, 12 volts, 24 volts, or 48 volts. The auxiliary battery 15 is also a secondary battery, which is rechargeable, and is, for example, a lead battery. The auxiliary battery 15 supplies power to a large number of auxiliary devices, which are not illustrated, via the auxiliary power line 31 that runs throughout the vehicle. A negative electrode of the auxiliary battery 15 and negative electrodes of the auxiliary devices 30 are connected via a ground. In an auxiliary power system, a body of the vehicle corresponds to a ground terminal.

The power converter 20 is connected to the main battery 11 via the system main relay 12. The power converter 20 converts output power from the main battery 11 into driving power of the traction motor 50. The power converter 20 includes a bidirectional DC-DC converter circuit 21, an inverter circuit 22, and a capacitor 23. The traction motor 50 has a driving voltage between 200 volts and 600 volts. If a driving voltage target of the traction motor 50 is higher than the output voltage of the main battery 11, the bidirectional DC-DC converter circuit 21 boosts the output voltage of the main battery 11 to the driving voltage of the traction motor 50. The inverter circuit 22 converts the boosted direct-current power into alternating-current power for driving the traction motor 50. For convenience of description, the bidirectional DC-DC converter circuit 21 will hereinafter simply be referred to as the bidirectional converter circuit 21.

The traction motor 50 generates power by utilizing an inertial force of the vehicle when a driver presses a brake pedal. The power generated by the traction motor 50 is referred to as regenerative power. The inverter circuit 22 can also convert alternating-current regenerative power into direct-current power, and transmit it to the bidirectional converter circuit 21. The bidirectional converter circuit 21 steps down the regenerative power, which has been converted into the direct-current power, to the voltage of the main battery 11. The main battery 11 is charged with the stepped-down regenerative power.

A circuit configuration of the bidirectional converter circuit 21 will be described. The bidirectional converter circuit 21 is constituted of two transistors 211, 212, two diodes 215, 216, a reactor 213, and a capacitor 214. The two transistors 211, 212 are connected in series between inverter-side terminals (a positive electrode terminal 203 and a negative electrode terminal 204) of the bidirectional converter circuit 21. The diode 215 is connected in inverse parallel with the transistor 211, and the diode 216 is connected in inverse parallel with the transistor 212. The diodes 215, 216 are provided for allowing a current to flow by bypassing the transistors 211, 212 when they are in an off state.

The reactor 213 has one end thereof connected to a midpoint of the series connection of the transistors 211, 212, and has the other end thereof connected to a battery-side positive electrode terminal 201 of the bidirectional converter circuit 21. The capacitor 214 is connected between the battery-side positive electrode terminal 201 and a battery-side negative electrode terminal 202 of the bidirectional converter circuit 21. The battery-side negative electrode terminal 202 and the inverter-side negative electrode terminal 204 of the bidirectional converter circuit 21 are directly connected.

The transistor 211 on positive electrode's side of the series connection is mainly involved in a stepping-down operation, while the transistor 212 on negative electrode's side of the series connection is mainly involved in a boosting operation. The circuit configuration and operation of the bidirectional converter circuit 21 in FIG. 1 are well known, so detailed description thereof will be omitted.

The capacitor 214 serves to temporarily store electric energy in the bidirectional converter circuit 21. The capacitor 23 that smooths a current transmitted from the main battery 11 is connected in parallel between the bidirectional converter circuit 21 and the inverter circuit 22. As illustrated in FIG. 1, the capacitors 214, 23 are connected between a positive electrode and a negative electrode of the main battery 11 via the system main relay 12.

The system main relay 12 is a switch that switches between connection and disconnection between the power converter 20 and the main battery 11. The system main relay 12 is controlled by the controller 13 of the power source system 10. When the main switch 41 of the vehicle is turned on, the controller 13 closes the system main relay 12 after pre-charging of the capacitors 214, 23 (to be described below) and connects the power converter 20 to the main battery 11. Dotted-line arrows in FIG. 1 represent signal lines. The auxiliary devices 30, such as the controller 13 of the power source system 10, the engine controller 32, the air conditioner 33, and the car navigation system 34, are capable of communicating with each other by an in-vehicle network 35.

The boost converter 14 has a low voltage terminal 142 thereof connected to the auxiliary battery 15 and a high voltage terminal 141 thereof connected to the power converter 20 on a side closer to the power converter 20 relative to the system main relay 12. In other words, the high voltage terminal 141 of the boost converter 14 is connected to the power converter 20 without interposing the system main relay 12. The boost converter 14 can boost the output voltage of the auxiliary battery 15 and supply it to the power converter 20 (the capacitors 214, 23).

The controller 13 controls the system main relay 12 and the boost converter 14. The controller 13 includes a CPU 131 and a memory 132, and can execute various processes by the CPU 131 executing a program stored in the memory 132. The power source system 10 includes a voltage sensor 17 that measures a voltage of the auxiliary battery 15 and a current sensor 16 that measures a current of the auxiliary battery 15. Data of these sensors is sent to the controller 13. Although not illustrated, a voltage sensor is also connected between the battery-side positive electrode terminal 201 and the battery-side negative electrode terminal 202 of the bidirectional converter circuit 21, and measurement data of this voltage sensor is also sent to the controller 13. The voltage sensor between the positive electrode terminal 201 and the negative electrode terminal 202 measures a voltage across each of the capacitors 214, 23 in a pre-charging process to be described below.

As is understood from the block diagram in FIG. 1, when the system main relay 12 is switched from an open state (open) to a connected state (close), the power converter 20 is connected to the main battery 11, and a current of the main battery 11 flows into the capacitors 214, 23 of the power converter 20. Even when the transistor 211 is off, the current of the main battery 11 flows into the capacitor 23 through the diode 215. When the system main relay 12 is closed in a state where the capacitors 214, 23 are completely discharged, the current of the main battery 11 suddenly flows into the capacitors 214, 23 through the system main relay 12. The surge of large current through the system main relay 12 may cause contact melting of the system main relay 12. Thus, when the main switch 41 is turned on, the controller 13 charges the capacitors 214, 23 in advance by using the auxiliary battery 15 and the boost converter 14 prior to switching the system main relay 12 from the open state to the connected state. Charging the capacitors 214, 23 before closing the system main relay 12 is referred to as pre-charging.

Charging the capacitors 214, 23 requires an appropriate amount of power. Moreover, after the turn-on of the main switch 41 of the vehicle, the system main relay 12 cannot be switched to the connected state unless the pre-charging has been completed. It is therefore desirable that the pre-charging is achieved as quickly as possible with use of a large current.

Meanwhile, when the main switch 41 of the vehicle is turned on, some of the auxiliary devices in the vehicle execute their initializing processes at activation. The auxiliary devices operate by being supplied with power from the auxiliary battery 15. For example, the engine controller 32 checks its own circuit and checks whether an injector device and the like of the engine 51 are energized, as its initializing process at activation. In addition, an electric-powered shift device, which belongs to the auxiliary devices, operates an actuator that moves a shift lever for zero-point reset of a shift position. Moreover, an electronically controlled brake device, which belongs to the auxiliary devices, accumulates a reserve pressure in an accumulator.

If consumption current of the auxiliary devices increases during the pre-charging, power from the auxiliary battery 15 may become insufficient, which may result in unstable operation of the boost converter 14 that executes the pre-charging or unstable operations of the auxiliary devices. Thus, the controller 13 of the power source system 10 of the embodiment starts the pre-charging after the consumption current of the auxiliary devices has passed its peak.

Figure 2:
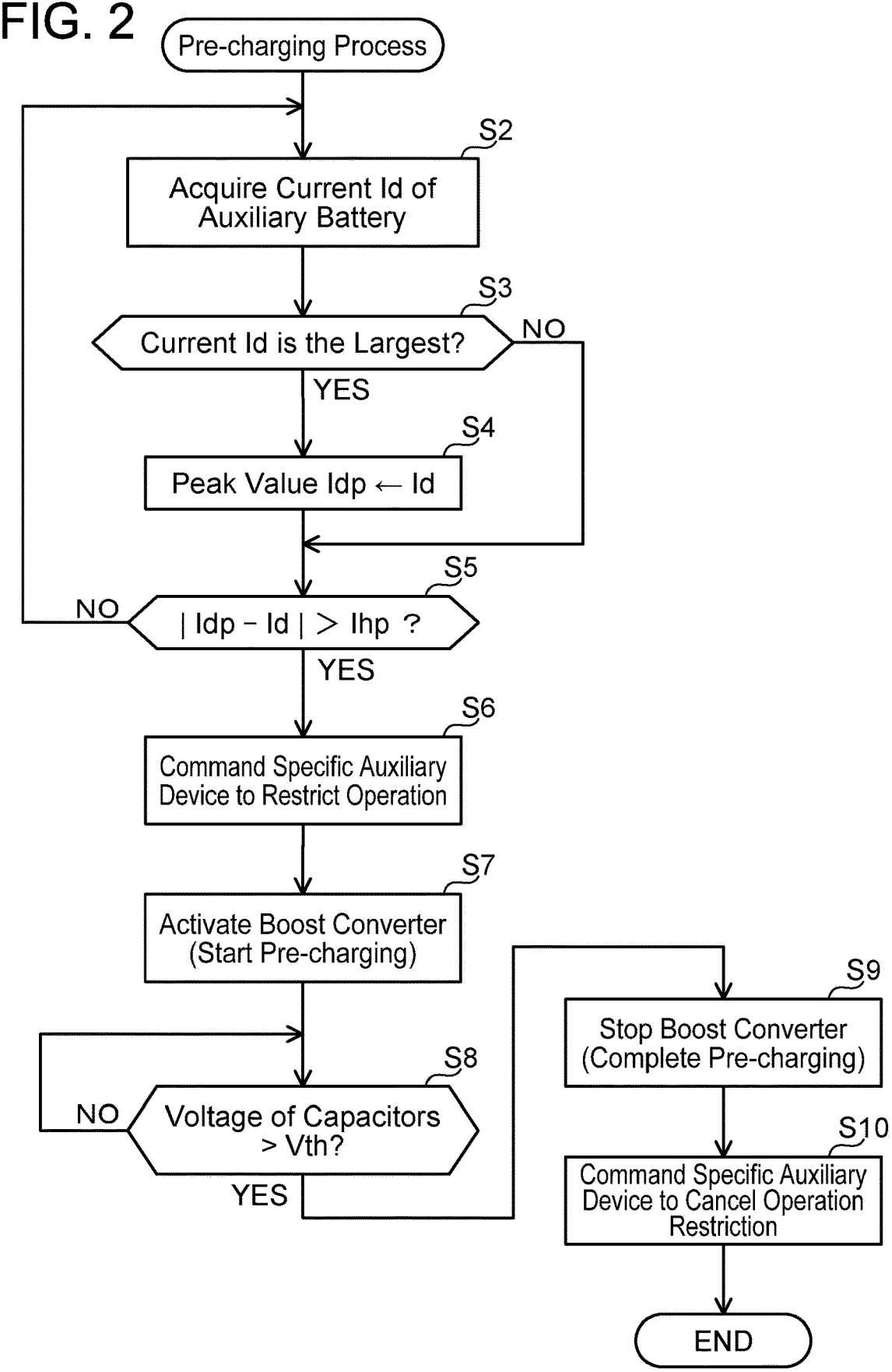
FIG. 2 is a flow chart of a pre-charging process executed by a controller.

With reference to FIG. 2, the pre-charging process executed by the controller 13 will be described. FIG. 2 is a flow chart of the pre-charging process. The process in FIG. 2 is started when the main switch 41 of the vehicle is turned on. The controller 13 monitors an output current (a current Id) of the auxiliary battery 15 before starting the pre-charging. When the current Id falls from its peak value by more than a predetermined current difference, the controller 13 starts the pre-charging.

Firstly, the controller 13 acquires the output current (the current Id) of the auxiliary battery 15 from the current sensor 16 (step S2). Next, the controller 13 checks whether or not the current Id acquired at this time (hereinbelow referred to as "presently acquired current Id") is the largest since the monitoring of the current Id was started (step S3). If the presently acquired current Id is the largest (step S3: YES), the controller 13 stores the presently acquired current Id in the memory 132 as a peak value Idp (step 54). If the presently acquired current Id is not the largest (step S3: NO), the peak value Idp is not updated.

Next, when a difference between the peak value Idp and the presently acquired current Id becomes larger than the predetermined current difference Ihp (step S5: YES), the controller 13 sends to a specific auxiliary device a command for restricting its operation (hereinbelow referred to as "operation restricting command") (step S6), and starts the pre-charging by activating the boost converter 14 (step S7). In other words, when the current Id of the auxiliary battery 15 falls from the peak value Idp by more than the current difference Ihp, the controller 13 starts the pre-charging. The current difference Ihp is set to a current value required for the pre-charging. The controller 13 sets an output current of the boost converter 14 to the current difference Ihp and activates the boost converter 14.

The controller 13 keeps monitoring the current Id of the auxiliary battery 15 (step S5: NO, step S2) until the current Id of the auxiliary battery 15 falls from the peak value Idp by more than the current difference Ihp. The operation restricting command in step S6 will be described later.

When the voltage of each of the capacitors 214, 23 exceeds a predetermined voltage threshold Vth (e.g., a voltage that is 90% of the voltage of the main battery 11) by the activation of the boost converter 14 (step S8: YES), the controller 13 stops the boost converter 14 and completes the pre-charging (step S9). Lastly, the controller 13 sends to the specific auxiliary device, to which the operation restricting command was sent previously, a command for cancelling the restriction on the operation (hereinbelow referred to as "operation restriction cancelling command") (step S10). The pre-charging process is hereby completed. As mentioned above, the voltage sensor is connected between the positive electrode terminal 201 and the negative electrode terminal 202 of the bidirectional converter circuit 21, and the controller 13 acquires the voltage of each of the capacitors 214, 23 from this voltage sensor.

After completing the pre-charging, the controller 13 closes the system main relay 12 and connects the power converter 20 to the main battery 11. When the power converter 20 is connected to the main battery 11, the hybrid vehicle 100 becomes ready to travel.

Since the capacitors 214, 23 have been charged by the pre-charging, no large inrush current flows when the system main relay 12 is closed. In the embodiment above, each of the capacitors 214, 23 is charged by the pre-charging such that the voltage thereof exceeds 90% of the output voltage of the main battery 11. A charging amount for each of the capacitors 214, 23 by the pre-charging is desirably close to the output voltage of the main battery 11.

Figure 3:
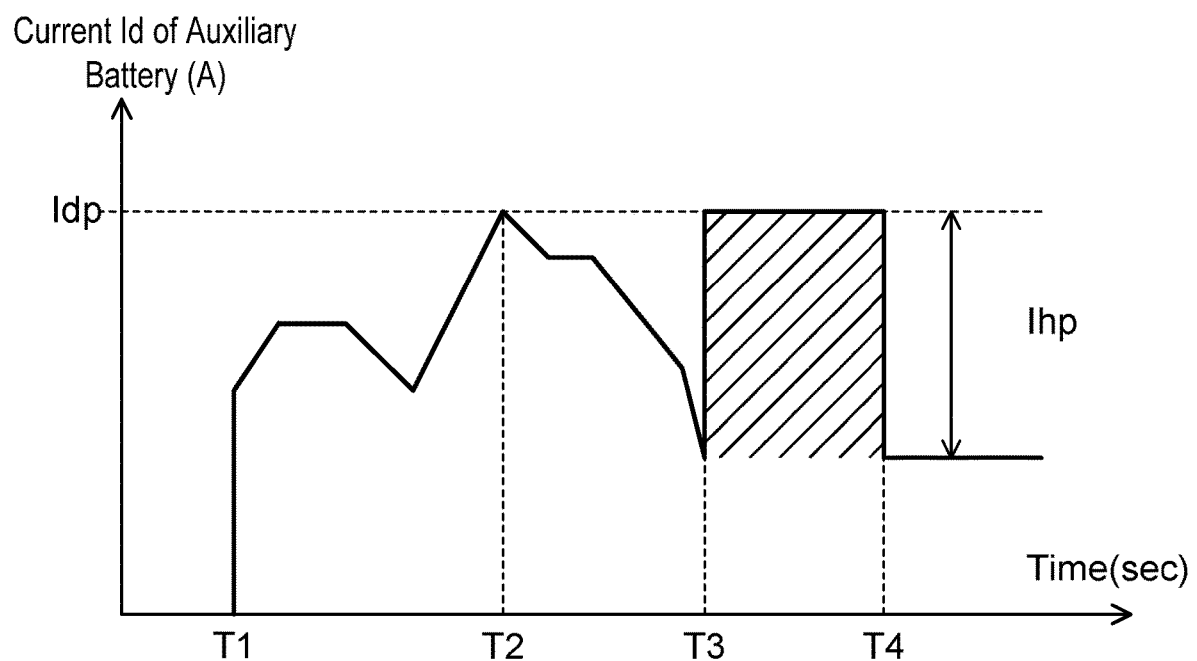
FIG. 3 is a time chart illustrating an example of chronological changes in a current of an auxiliary battery.

FIG. 3 illustrates an example of chronological changes in the current of the auxiliary battery 15. In a graph in FIG. 3, an abscissa axis represents time and an ordinate axis represents the current Id of the auxiliary battery 15. At a time T1, the main switch 41 of the vehicle is turned on and some of the auxiliary devices start their initialization. Therefore, at the time T1 and thereafter, the current Id is outputted from the auxiliary battery 15. The controller 13 monitors the current Id of the auxiliary battery 15 and stores its peak value Idp in the memory 132. In the example of time chart in FIG. 3, the current Id of the auxiliary battery 15 reaches its peak at a time T2. Subsequently, the controller 13 waits for the current Id to fall from the peak value Idp by more than the current difference Ihp. In the example of the time chart in FIG. 3, the current Id falls from the peak value Idp by the current difference Ihp at a time T3. The controller 13 starts the pre-charging at the time T3 at which the current Id falls by the current difference Ihp. The controller 13 sets the output current of the boost converter 14 to the current difference Ihp.

At the time T3 and thereafter, the boost converter 14 outputs the current Ihp for the pre-charging while the auxiliary devices consume current. In the time chart in FIG. 3, an area hatched by oblique lines represents a power amount stored in the capacitors 214, 23. In the example in FIG. 3, the pre-charging of the capacitors 214, 23 is completed at a time T4, and the controller 13 stops the boost converter 14. After the completion of the pre-charging, the controller 13 closes the system main relay 12 and connects the power converter 20 to the main battery 11.

According to the process in FIG. 2, the controller 13 starts the pre-charging when the current Id of the auxiliary battery 15 (i.e., total consumption current of the auxiliary devices 30) falls from the peak value by more than the current difference Ihp after the current Id of the auxiliary battery 15 has reached the peak value. Since the pre-charging is started after the peak of the consumption current of the auxiliary devices 30 has passed, there is little possibility that the output from the auxiliary battery 15 becomes insufficient due to the increase in the consumption current of the auxiliary devices during the pre-charging. In other words, according to the process in FIG. 2, the pre-charging can be executed stably.

The operation restricting command to the specific auxiliary device in step S6 will be described. For example, if the air conditioner 33, which belongs to the auxiliary devices, starts operating at its maximum output after the start of the pre-charging, the consumption current of the auxiliary devices significantly increases. When this happens, power from the auxiliary battery 15 may become insufficient. Thus, the controller 13 starts the pre-charging, and in addition, sends the operation restricting command to the specific auxiliary device (auxiliary device whose current consumption will possibly become large). By restricting the operation of the specific auxiliary device during the pre-charging, it is possible to prevent an increase in the consumption current of the auxiliary devices 30 during the pre-charging. For example, the operation restriction may be a command for restricting an output of the air conditioner 33 to its intermediate-level output in the case of the air conditioner 33, and may be a command for prohibiting activation in the case of the car navigation system 34. When the pre-charging is completed, the controller 13 sends the operation restriction cancelling command to the specific auxiliary device (the auxiliary device to which the operation restricting command was sent) (step S10). The operation restricting command and the operation restriction cancelling command are sent through the in-vehicle network 35.

The power source system 10 described in the embodiment has features as follows. The power source system 10 includes the main battery 11, the power converter 20, the system main relay 12, the auxiliary battery 15, the boost converter 14, and the controller 13. The power converter 20 includes the capacitors 214, 23 connected to the main battery 11 via the system main relay 12. When the main switch 41 of the vehicle is turned on, the controller 13 pre-charges the capacitors 214, 23 by operating the boost converter 14 prior to closing the system main relay 12 and connecting the power converter 20 to the main battery 11. The controller 13 stores the peak value Idp of the current Id of the auxiliary battery 15 in the memory 132. The controller 13 starts to pre-charge the capacitors 214, 23 by activating the boost converter 14 when the current Id of the auxiliary battery 15 falls from the peak value hip by more than the predetermined current difference Ihp.

The controller 13 restricts the operation of the specific auxiliary device connected to the auxiliary battery 15 after starting to pre-charge the capacitors 214, 23. Such a process can prevent an unexpected increase in consumption current of the specific auxiliary device during the pre-charging. The specific auxiliary device may be limited to an auxiliary device whose consumption current will possibly become larger than a predetermined consumption current threshold.

Points to be noted relating to the technology described in the embodiment will be described. The main battery 11 corresponds to an example of main power source. The main power source may be a fuel cell. The auxiliary battery 15 corresponds to an example of auxiliary power source.

The boost converter 14 may be a bidirectional DC-DC converter. In this case, it is possible to charge the auxiliary battery 15 by switching the system main relay 12 to the connected state, and then stepping down the power of the main battery 11.

The pre-charging process described in the embodiment may be executed by a plurality of computers that are capable of communicating with each other by an in-vehicle network. In other words, an actual configuration of the controller 13 described in the embodiment may be a plurality of computers connected to be able to communicate with each other by a network.

The vehicle in the embodiment is the hybrid vehicle that includes the traction motor 50 and the engine 51. The power source system for a vehicle disclosed herein can also be applied to a fuel-cell vehicle and an electric vehicle that include no engine.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A power source system for a vehicle comprising:
    a main power source;
    a power converter configured to convert an output power from the main power source, the power converter including a capacitor connected between a positive electrode and a negative electrode of the main power source;
    a relay configured to switch between connection and disconnection between the power converter and the main power source;
    an auxiliary power source having an output voltage lower than an output voltage of the main power source;
    a boost converter having a low voltage terminal thereof connected to the auxiliary power source, the boost converter having a high voltage terminal thereof connected to the power converter without interposing the relay; and
    a controller configured to:
        pre-charge the capacitor by operating the boost converter prior to placing the relay in a connected state when a main switch of the vehicle is turned on;
        store a peak value of a current of the auxiliary power source in a memory of the controller, the current of the auxiliary power source being a load current, and the peak value changing depending on a condition of an auxiliary device; and
        start to pre-charge the capacitor when the current of the auxiliary power source falls from the peak value by more than a predetermined current difference.

2. The power source system for the vehicle of claim 1, wherein the controller is configured to restrict an operation of a specific auxiliary device connected to the auxiliary power source after starting to pre-charge the capacitor.

* * * * *